US009503277B2

(12) United States Patent
Dong et al.

(10) Patent No.: US 9,503,277 B2
(45) Date of Patent: Nov. 22, 2016

(54) DYNAMIC INSTANTIATION OF REMOTE VIRTUAL EXTENSIBLE LOCAL AREA NETWORK TUNNEL END POINTS ACQUIRED THROUGH A CONTROL PROTOCOL

(71) Applicant: CISCO TECHNOLOGY, INC., San Jose, CA (US)

(72) Inventors: Liqin Dong, San Jose, CA (US); Yibin Yang, San Jose, CA (US); Di Jin, Fremont, CA (US); Xinggang Zhou, Fremont, CA (US); Siu-Man Leung, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 167 days.

(21) Appl. No.: 14/340,079

(22) Filed: Jul. 24, 2014

(65) Prior Publication Data

US 2016/0028557 A1 Jan. 28, 2016

(51) Int. Cl.
*H04L 12/28* (2006.01)
*H04L 12/46* (2006.01)
*H04L 12/751* (2013.01)

(52) U.S. Cl.
CPC ....... *H04L 12/4641* (2013.01); *H04L 12/4633* (2013.01); *H04L 45/08* (2013.01); *H04L 2012/4629* (2013.01)

(58) Field of Classification Search
CPC ............... H04L 12/4641; H04L 45/08; H04L 12/4633; H04L 2012/4629
USPC .................................................. 370/395, 392
See application file for complete search history.

(56) References Cited

U.S. PATENT DOCUMENTS

| 2013/0318219 | A1 | 11/2013 | Kancherla |
| 2013/0322453 | A1 | 12/2013 | Allan |
| 2014/0123211 | A1 | 5/2014 | Wanser |
| 2014/0123212 | A1 | 5/2014 | Wanser |
| 2014/0146817 | A1 | 5/2014 | Zhang |
| 2015/0055651 | A1* | 2/2015 | Shen ................... H04L 12/1854 370/390 |
| 2015/0058470 | A1* | 2/2015 | Duda .................. H04L 12/4633 709/224 |
| 2015/0082418 | A1* | 3/2015 | Gu ...................... H04L 12/4633 726/15 |
| 2015/0236871 | A1* | 8/2015 | Kang .................. H04L 12/4633 370/390 |
| 2015/0280928 | A1* | 10/2015 | Tessmer .............. H04L 12/4641 370/390 |
| 2015/0281062 | A1* | 10/2015 | Duda ..................... H04L 45/74 709/238 |

OTHER PUBLICATIONS

VXLAN: A Framework for Overlaying Virtualized Layer 2 Networks over Layer 3 Networks; Dutt et al.; Apr. 4, 2014.*

* cited by examiner

*Primary Examiner* — Faisal Choudhury
(74) *Attorney, Agent, or Firm* — Patent Capital Group

(57) ABSTRACT

A method is provided in one example embodiment and includes acquiring at a local network element information regarding a remote network element via a control protocol distribution method and refraining from instantiating the remote VTEP for the remote network element on the local network element until unicast traffic from the local network element to the remote network element via an overlay network has begun. The method may further include detecting unicast traffic from the local network element to the remote network element and subsequent to the detecting, instantiating the remote VTEP for the remote network element on the local network element. Some embodiments may include detecting cessation of the unicast traffic from the local network element to the remote network element and subsequent to the detecting cessation, uninstantiating the remote VTEP for the remote network element from the local network element.

15 Claims, 6 Drawing Sheets

DYNAMIC INSTANTIATION OF REMOTE VIRTUAL EXTENSIBLE LOCAL AREA NETWORK TUNNEL END POINTS ACQUIRED THROUGH A CONTROL PROTOCOL

TECHNICAL FIELD

This disclosure relates in general to the field of computer networking and, more particularly, to techniques for dynamic instantiation of remote Virtual eXtensible Local Area Network ("VXLAN") tunnel end points acquired through a control protocol.

BACKGROUND

Overlay networks in general, and Internet protocol ("IP") overlay networks in particular, are gaining popularity for providing virtual machine ("VM") mobility over L3 networks. Virtual eXtensible Local Area Network ("VXLAN") is a technique for providing an L2 overlay on an L3 network. In particular, VXLAN is used to address the need for overlay networks within virtualized data centers accommodating multiple tenants. In such overlay networks, native frames are encapsulated with an outer IP overlay encapsulation, as along with a VXLAN header, and UDP header. In VXLAN, each overlay is referred to as a VXLAN segment. VMs within the same VXLAN segment are within the same layer 2 domain. Each VXLAN segment is scoped through a 24-bit segment ID, referred to as a VXLAN Network Identifier ("VNI"), which allows up to 16 M VXLAN segments to coexist within a single administrative domain. The VNID scopes the inner MAC frame originated by the individual VM; therefore, overlapping MAC addresses may exist across segments without resulting in traffic cross-over. The VNID is included in an outer VXLAN header envelope in which the inner MAC frame originated by the VM is encapsulated. The term "VXLAN segment" herein may be used interchangeably with the term "VXLAN overlay network."

A VXLAN tunnel endpoint ("VTEP") is a hardware or software component that performs VXLAN encapsulation and decapsulation. The IP address used by a VTEP as the source address for VXLAN encapsulation is referred to as the VTEP address. The VTEP address, along with the inner source MAC addresses, may be learned by remote VTEPs. Multidestination frames in VXLAN may be carried in IP multicast packets, which use group addresses (possibly allocated per Virtual Network Identifier ("VNI")) as destination IP addresses, or carried in IP unicast packets, which are replicated at the tunnel headend. Additional details are provided in "VXLAN: A Framework for Overlaying Virtualized Layer 2 Networks over Layer 3 Networks" (draft-mahalingam-dutt-dcops-vxlan-02) (hereinafter "VXLAN Draft"), which is hereby incorporated by reference in its entirety.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes acquiring at a local network element information regarding a remote network element via a control protocol distribution method and refraining from instantiating a remote VTEP for the remote network element on the local network element until unicast traffic from the local network element to the remote network element via an overlay network has begun. The method further includes detecting unicast traffic from the local network element to the remote network element; and subsequent to the detecting, instantiating the remote VTEP for the remote network element on the local network element. The detecting may include punting a first packet of the unicast traffic from the local network element to the remote network element to a central processing unit ("CPU") associated with the local network element, in which case the punting triggers the instantiating. The method may further include detecting cessation of the unicast traffic from the local network element to the remote network element and, subsequent to the detecting cessation, uninstantiating the remote VTEP for the remote network element from the local network element.

Some embodiments may include installing on the local network element a host route tied to the remote network element, detecting whether the remote VTEP for the remote network element is instantiated on the local network element, and instantiating the remote VTEP for the remote network element on the local network element if instantiation of the remote VTEP for the remote network element on the local network element is not detected. The installing may be performed using conversational learning. Certain embodiments may include uninstantiating the remote VTEP for the remote network element from the local network element upon detecting that all host routes to the remote network element are aged out on the local network element. Each of the local network element and the remote network element may be implemented as a Virtual eXtensible Local Area Network Tunnel End Point ("VTEP"). Additionally, the protocol may be Border Gateway Protocol ("BGP") and the overlay network may be implemented using Virtual eXtensible Local Area Network ("VXLAN") technology.

Example Embodiments

VXLAN, which is currently a popular virtualization solution for data centers, addresses many of the challenges known to exist with respect to VLANs. In particular, VXLAN technology is designed to provide the same services to devices connected to Ethernet end systems that VLANs do. In addition, VXLAN provides a means by which to extend an L2 network over a L3 network. In a VXLAN environment, the VTEP connects a vSwitch of a virtualized host server to the IP network; the VTEP is disposed within the hypervisor that manages the VMs. The VMs themselves are unaware of both VXLAN and the function of the VTEP, which is to encapsulate the VM traffic within an IP header (to create a VXLAN packet) to send across an IP network. An important aim of VXLAN is to enable dynamic large scale isolated virtual L2 networks to be created for virtualized and multi-tenant environments by encapsulating frames in VXLAN packets.

Figure 1:
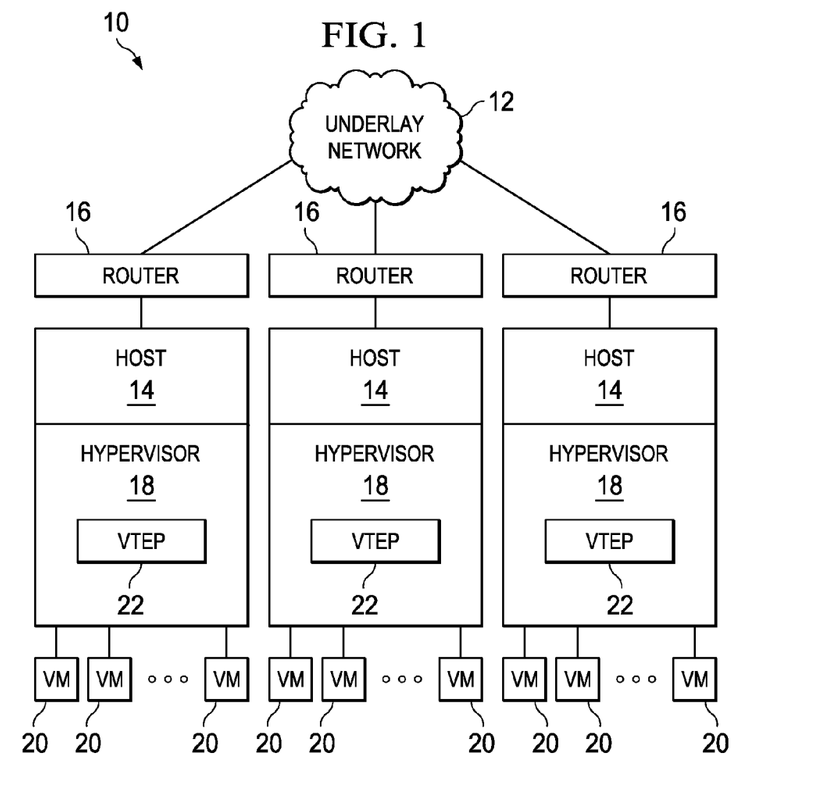
FIG. 1 is a simplified block diagram of a data communications environment implemented utilizing an overlay network in accordance with one embodiment.

Referring now to FIG. 1, shown therein is a simplified block diagram of a data communications system 10 implemented utilizing an underlay network 12 in accordance with one embodiment. In one embodiment, the system 10 is a data center. As shown in FIG. 1, several virtualized host servers, represented by host servers 14, are connected to the underlay network 12 either directly or via one or more routers, collectively represented in FIG. 1 by routers 16. Each of the hosts 14 has installed thereon a hypervisor 18 for managing one or more VMs 20 instantiated on the host.

It will be assumed for the sake of example herein that the underlay network 12 is an Internet protocol ("IP") network and as such includes a number of network devices that communicate using IP. Such network devices may include, for example, computers, servers, network appliances, hosts, routers, switches, gateways, bridges, virtual equipment, load-balancers, firewalls, processors, modules, or any other suitable device, component, element, or object operable to exchange information in a communications environment. Moreover, the network devices may include any suitable hardware, software, components, modules, interfaces, or objects that facilitate the operations thereof. This may be inclusive of appropriate algorithms and communication protocols that allow for the effective exchange of data or information. Additionally, it will be assumed for the sake of example that the system 10 is implemented using VXLAN. However, it should be noted that other types of overlay networks and implementing technologies (such as NVGRE) may be employed and implemented using the teachings described herein without departing the spirit or scope of the embodiments. Accordingly, each hypervisor 18 includes a VTEP 22 for performing VXLAN encapsulation/decapsulation, as described in greater detail below.

Figure 2:
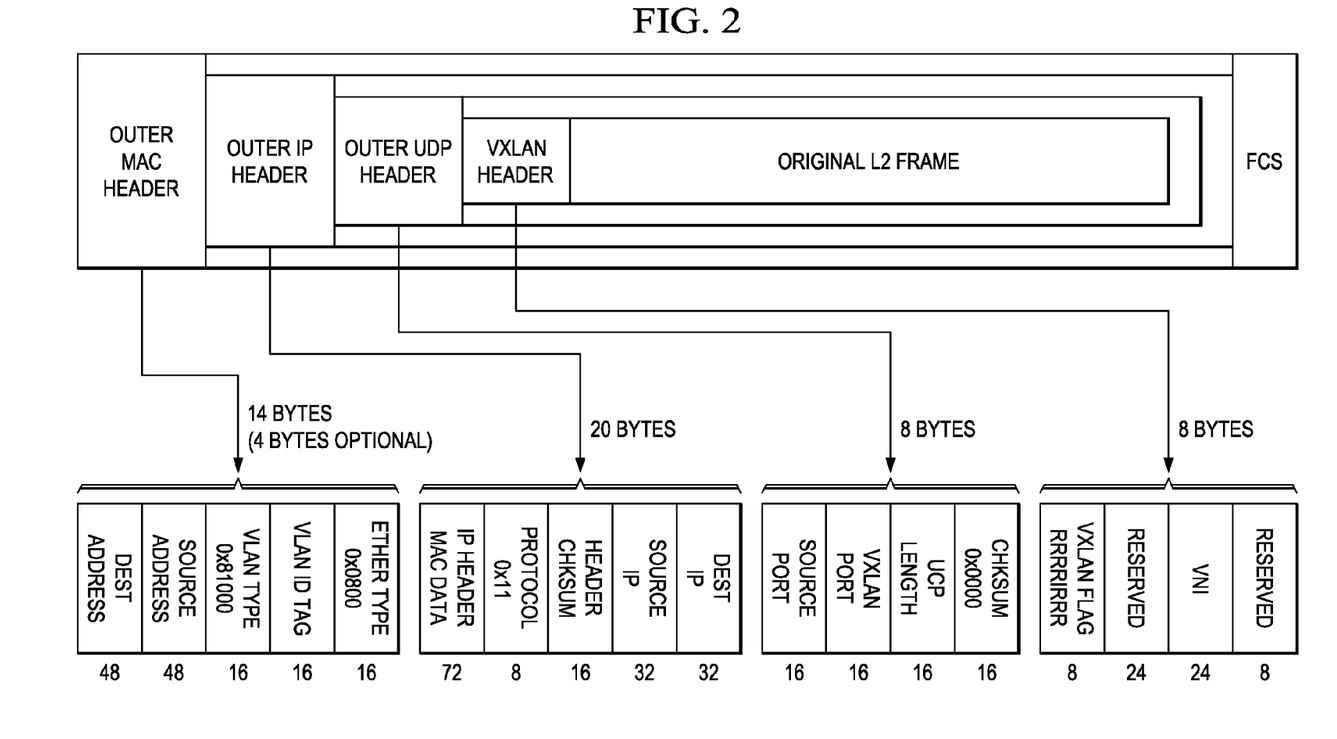
FIG. 2 illustrates a format of a VXLAN-encapsulated data frame in accordance with features of embodiments described herein.

As previously noted, in one embodiment, VXLAN encapsulation may be used; however, it will be understood that other encapsulation techniques, such as NVGRE and others, may be employed without departing from the spirit or scope of the embodiments described herein. In general, VXLAN utilizes IP-based encapsulation and provides for a virtual L2 network. FIG. 2 illustrates the format of a VXLAN transport header format. In VXLAN, the original L2 packet from a VM encapsulated in a VXLAN header that includes the VNI associated with the VXLAN segments to which the VM belongs. The VXLAN header-encapsulated packet is further encapsulated in a UDP header, then an IP header, then a MAC, or Ethernet, header. As previously noted, VXLAN frame encapsulation is performed by the VTEP, which has an uplink interface and a downlink interface. The uplink interface receives VLXAN frames and functions as a tunnel endpoint with an IP address used for routing VXLAN encapsulated frames. The functionality of a VTEP can be implemented in software (as a vSwitch, for example) or in the form a physical switch. It should be noted that each VM can connect into a hypervisor via multiple virtual Network Interface Card ("vNIC") connections, such that one VM can connect using multiple links into the vSwitch.

VXLAN frames are sent to the IP address assigned to the destination VTEP specified in the Outer IP DA field. The IP address of the source VTEP is specified in the Outer IP SA field. Packets received on the uplink are mapped from the VXLAN ID identified in a 24-bit VXLAN ID field of the VXLAN frame to a VLAN and the original Ethernet frame payload may optionally be sent as an 802.1Q Ethernet frame on the downlink. During this process, the inner MAC SA and VXLAN ID specified in the respective fields of the VLXAN frame are learned in a local table of the switch. Packets received on the downlink are mapped to a VXLAN ID using the VLAN of the frame. A lookup is then performed within the VTEP L2 table using the VXLAN ID and destination MAC; this lookup provides the IP address of the destination VTEP. The frame is then encapsulated and sent out the uplink interface.

To support unicast forwarding in VXLAN overlay, a VTEP needs to know the VTEP addresses of other VTEPs in the overlay network. Knowledge of remote VTEPs can be acquired using a data path learning approach or a control protocol based approach. The base VXLAN protocol, as specified in VXLAN Draft cited above, focuses on the first approach. "Layer-3 virtual network overlays based on BGP Layer-3 VPNs" (draft-drao-bgp-l3vpn-virtual-network-overlays-02) (hereinafter "L3 Draft"), hereby incorporated by reference in its entirety, describes a second, control protocol based, approach based on Border Gateway Protocol ("BGP"). The BGP-based approach will be used in a new data center networking architecture, referred to herein as "Vinci," and in the Nexus 9000 series of switches, available from Cisco Systems, Inc., of San Jose, Calif. For purposes of example, the BGP approach will be used for the rest of this document; however, it should be understood that the ideas and concepts described herein are equally applicable to other control protocols, such as Locator/ID Separation Protocol ("LISP").

Figure 3:
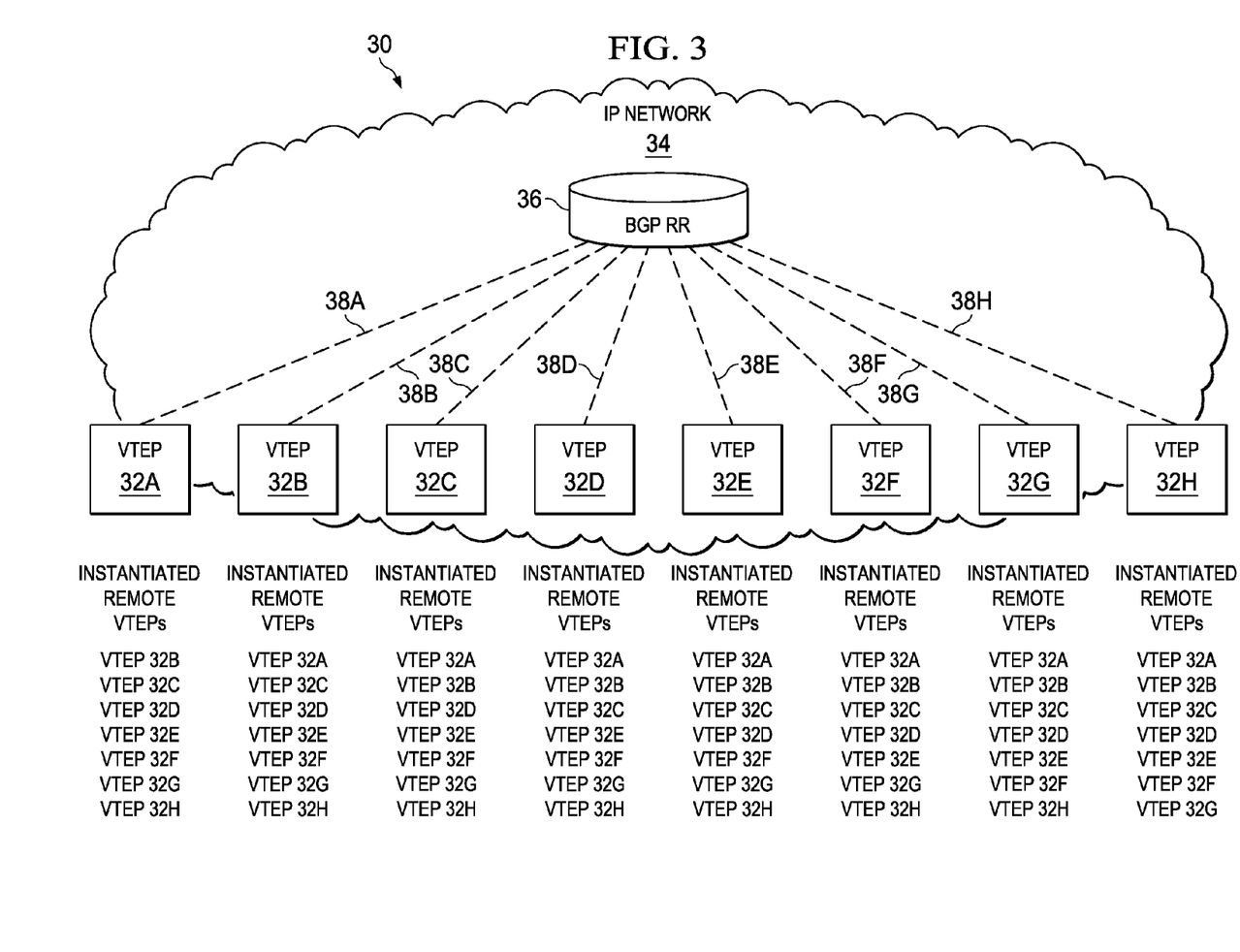
FIG. 3 is a simplified block diagram of a system for remote VTEP instantiation in a VXLAN type of data communications network using a control protocol based approach.

FIG. 3 is a simplified block diagram of a system 30 for remote VTEP instantiation in a VXLAN type of data communications network using a control protocol based approach. The VXLAN deployment illustrated in FIG. 3 includes eight VTEPs, designated by reference numerals 32A-32H, connected via an underlay IP network 34. A BGP route reflector ("RR") 36 is provided in the network 34 and establishes adjacencies with each of the VTEPs 32A-32H. The adjacencies are represented by dashed lines respectively designated by reference numerals 38A-38H. Each of the VTEPs 32A-32H passes its information through BGP to the RR 36, which then reflects the information to the other VTEPs. In this manner, each of the VTEPs 32A-32H can acquire VTEP information for all of the VTEPs in the network 34 regardless of whether or not it communicates with them. The use of BGP for distributing VTEP information avoids unnecessary flooding in the IP fabric.

Once a VTEP becomes aware of a remote VTEP, it needs to perform hardware programming so that unicast traffic to that VTEP can be properly forwarded. This process is referred to as "remote VTEP instantiation." Hardware resources are allocated upon a remote VTEP instantiation. On the other hand, the procedure to remove hardware programming associated with a remote VTEP is referred to as "remote VTEP uninstantiation." Hardware resources are freed upon a remote VTEP uninstantiation.

For the data path learning approach, a remote VTEP is immediately instantiated up on learning. As a common practice, it is uninstantiated when all MAC addresses associated with it are aged out. However, these behaviors may not be suitable for the control protocol based approach, due to differences in remote VTEP acquisition. Therefore, what is needed is a procedure for instantiating and uninstantiating remote VTEPs acquired through a control protocol.

A straightforward scheme for remote VTEP instantiation/uninstantiation is to perform hardware programming upon receipt of BGP advertisements and to remove the programming upon BGP withdrawals. FIG. 3 depicts remote VTEP instantiation in cases in which such a straightforward scheme is employed. For example, VTEP 32A instantiates seven remote VTEPs, including VTEPs 32B-32H, as BGP advertises all eight VTEPs in the network 34. Similarly, VTEP 32B instantiates remote VTEPs 32A, 32C-32H, VTEP 32C instantiates remote VTEPs 32A-32B, 32D-32H, VTEP 32D instantiates remote VTEPs 32A-32C, 32E-32H, VTEP 32E instantiates remote VTEPs 32A-32D, 32F-32H, VTEP 32F instantiates remote VTEPs 32A-32E, 32G-32H, VTEP 32G instantiates remote VTEPs 32A-32F, 32H, and VTEP 32H instantiates remove VTEPs 32A-32G. In summary, given n VTEPs in a network, such as network 34, n−1 remote VTEPs are instantiated in each VTEP and n*(n−1) remote VTEPs are instantiated network-wide.

Figure 4:
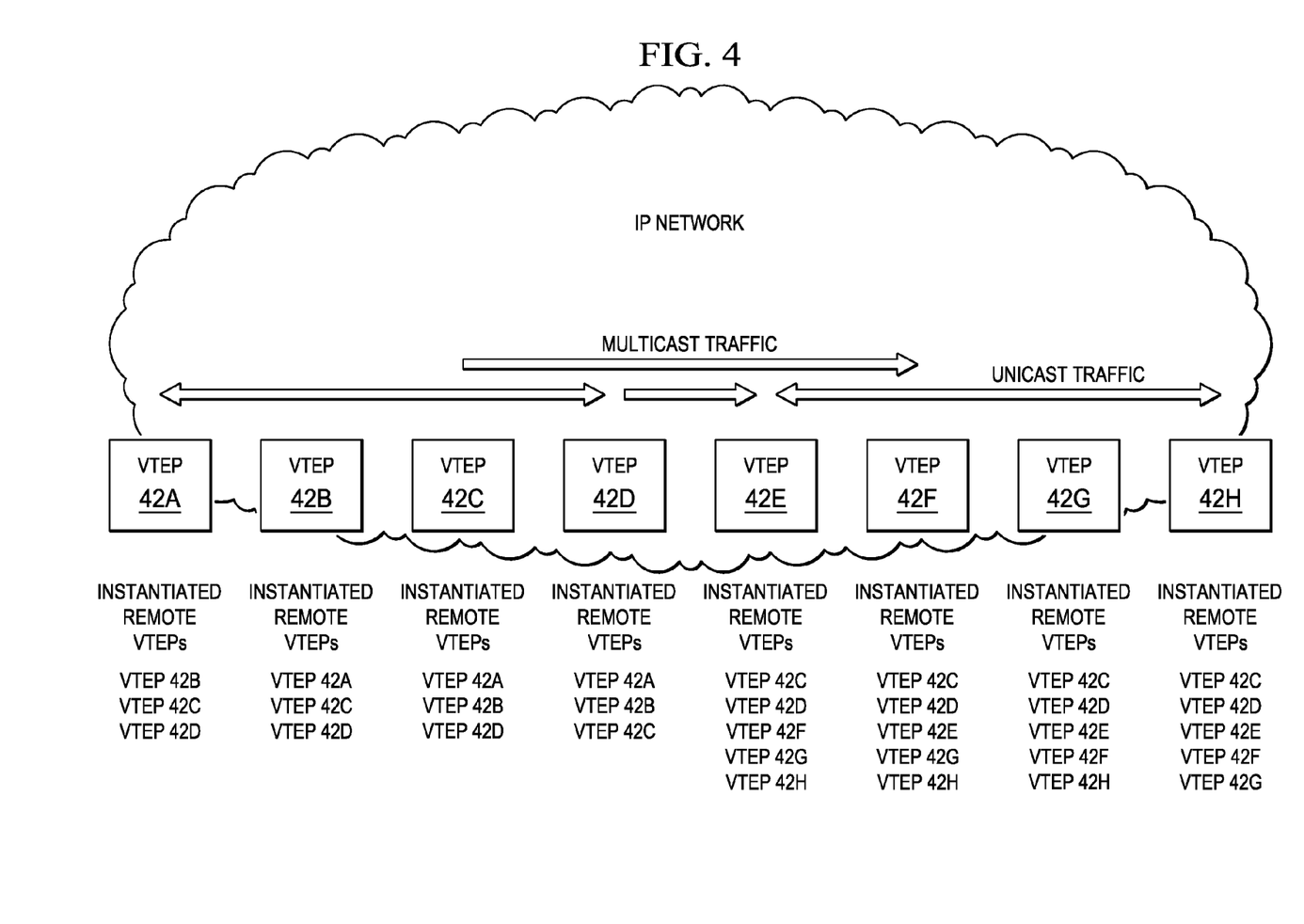
FIG. 4 is a simplified block diagram of a system for remote VTEP instantiation in a VXLAN type of data communications network using a using a data path learning approach.

Although the straightforward scheme illustrated in FIG. 3 is easy to implement, it clearly makes the control protocol based approach scale much worse than the data path learning approach. FIG. 4 is a simplified block diagram of a system 40 for remote VTEP instantiation in a VXLAN type of data communications network using a using a data path learning approach. Similar to the system 30, the system 40 includes eight VTEPs, designated by reference numerals 42A-42H, connected via an underlay IP network 44. It will be assumed for the sake of example that bidirectional unicast traffic flows within two sets of the VTEPs of system 40. The first such set includes VTEPs 42A-42D and the second such set includes VTEPs 42E-42H. It will be further assumed for the sake of example that unidirectional unicast traffic is communicated from VTEP 42D to VTEP 42E. Additionally, multicast traffic will be assumed to be communicated from VTEP 42C to VTEP 42F. Each VTEP learns other VTEPs from which it receives traffic. For example, VTEP 42A learns VTEPs 42B-42D because it receives traffic from those VTEPs. Similarly, VTEP 42B learns VTEPs 42A, 42C-42D, VTEP 42C learns VTEPs 42A-42B, 42D, and VTEP 42D learns VTEPs 42A-42C. In the same manner, VTEP 42E learns VTEPs 42F-42H because it receives traffic from those VTEPs, VTEP 42F learns VTEPs 42E, 42G-42H, VTEP 42G learns VTEPs 42E-42F, 42H, and VTEP 42H learns VTEPs 42E-42G. In addition, VTEP 42C and VTEP 42D may be learned by all other VTEPs (VTEPs 42A-42B and 42E-42H) as multicast traffic and unidirectional unicast traffic depend on underlay network multicast to reach VTEP 42E and VTEP 42F, respectively. As can be seen from FIG. 4, using data path learning, each VTEP 42A-42H only has three or five remote VTEPs instantiated thereon. This clearly compares favorably to the situation illustrated in FIG. 1, in which each VTEP has seven remote VTEPs instantiated thereon.

As the integrated circuit ("IC") chip industry is moving toward low cost merchant silicon with storage space for accommodating tables, it is important to employ an instantiation scheme for the control protocol based approach that can scale not worse than the data learning approach (illustrated in FIG. 4). For example, assume a low cost application-specific integrated circuit ("ASIC") used to implement a VTEP only has enough resources to support instantiations of five remote VTEPs. In the eight VTEP deployment model depicted in the figures, the ASIC can be used when the data path learning approach, as shown in FIG. 4, is employed; however, it cannot be used when the control protocol based approach is taken with straightforward instantiation scheme, as shown in FIG. 3, is used.

In accordance with features of embodiments described herein, a system for remote VTEP instantiation in a VXLAN type of data communications network using an alternative control protocol based approach, referred to herein as a dynamic scheme for remote VTEP instantiation, is proposed. The embodiments described herein further the goal of better scalability for control protocol based approaches. It will be noted that in a large VXLAN deployment of hundreds or even thousands of VTEPs, a VTEP may not need to communicate with all other VTEPs in the network. In some cases, a VTEP may only send unidirectional unicast traffic or multicast traffic to one other VTEP. For a VXLAN deployment that uses underlay IP network multicast for multi-destination traffic, the remote VTEP instantiation is for outbound traffic. A remote VTEP needs to be instantiated only when there is unicast traffic to it.

In accordance with features described herein for implementing the dynamic scheme for remote VTEP instantiation in a VXLAN type of data communications network, when a VTEP acquires a remote VTEP through BGP distribution, the VTEP does not immediately instantiate the remote VTEP in hardware. The remote VTEP information is maintained in the control plane only at this point. When the unicast traffic from the VTEP to the remote VTEP begins, the first packet is "punted," or copied to the CPU at the VTEP, which triggers instantiation of the remote VTEP. In Vinci, the punting can occur when conversational learning for the host route is turned on. When a host route tied to a VTEP is instantiated due to conversational learning, a determination can be made whether the remote VTEP is instantiated and if not, the remote VTEP can be instantiated at that point.

Figure 5:
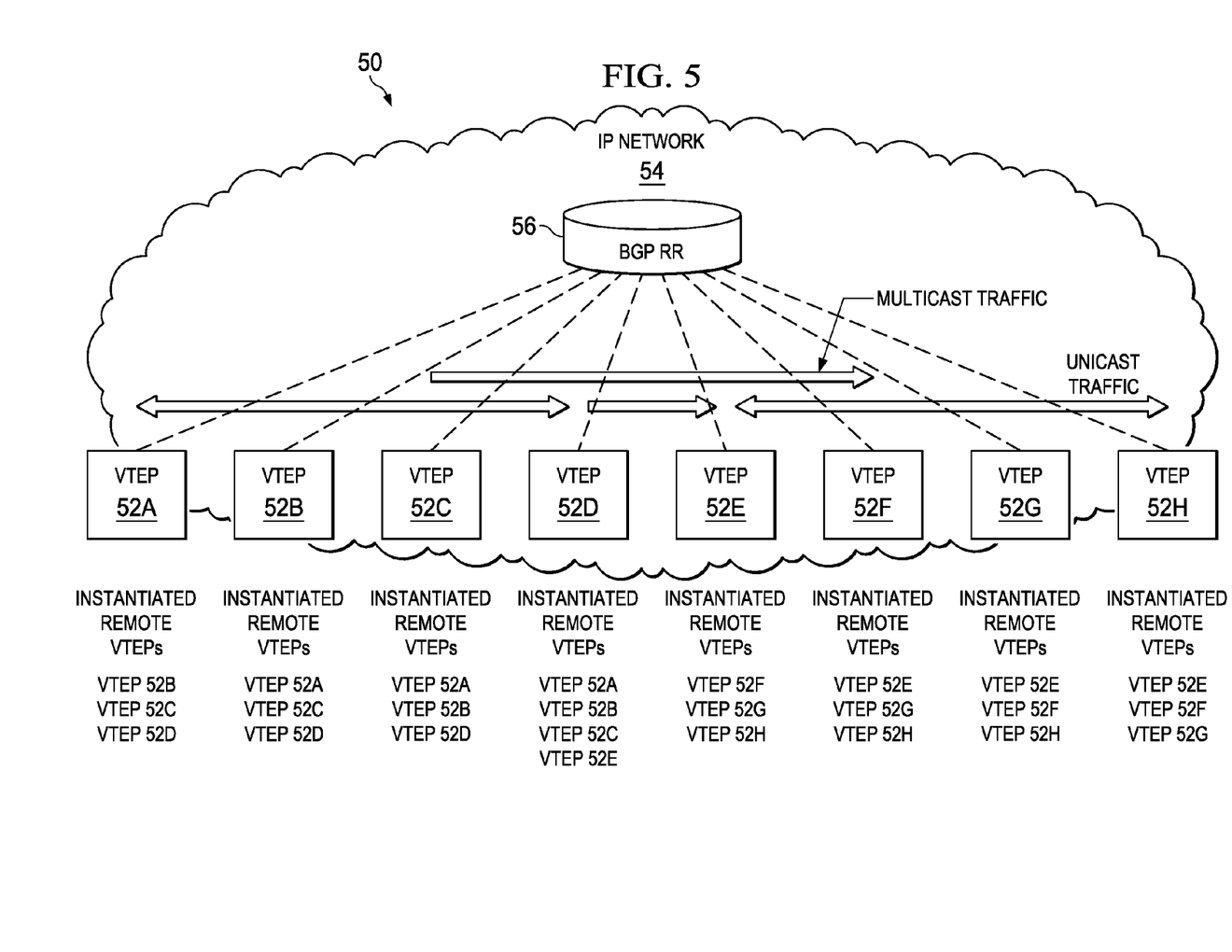
FIG. 5 is a more simplified block diagram of a system for remote VTEP instantiation in a VXLAN type of data communications network using an alternative control protocol based approach in accordance with features of embodiments described herein.

FIG. 5 is a simplified block diagram of a system 50 for remote VTEP instantiation in a VXLAN type of data communications network using an alternative control protocol based approach. Similar to the VXLAN deployments shown in FIGS. 3 and 4, the VXLAN deployment illustrated in FIG. 5 includes eight VTEPs, designated by reference numerals 52A-52H, connected via an underlay IP network 54. A BGP RR 56 is provided in the network 54 and establishes adjacencies with each of the VTEPs 52A-52H. Each of the VTEPs 52A-52H passes its information through BGP to the RR 56, which is capable of reflecting the information to the other VTEPs.

In accordance with features of embodiments described herein, a VTEP will not instantiate a remote VTEP if there is no unicast traffic from the VTEP to the remote VTEP. For example, VTEP 52A only instantiates remote VTEPs 52B-52D. Similarly, VTEP 52B only instantiates VTEPs 52A, 52C-52D and VTEP 52C only instantiates VTEPs 52A-52B, 52D. VTEP 52D instantiates VTEPs 52A-52C, as well as VTEP 52E (because VTEP 52D sends unicast traffic to VTEP 52E). Unlike the arrangement illustrated in FIG. 4, VTEP 52D is prevented from being instantiated in VTEPs 52E-52H. Additionally, in the cast of multicast traffic from VTEP 52C to VTEP 52F, VTEP 52C is prevented from instantiation in VTEPs 52E-52H. As a result, the control protocol based approach with dynamic VTEP instantiation as described herein scales better than the data path learning approach illustrated in FIG. 4. In summary with dynamic remote VTEP instantiation, the control protocol based approach scales the same as data path learning approach in the case of bidirectional unicast traffic and scales even better than the data path learning approach in the case of unidirectional unicast traffic and multicast traffic.

Figure 6:
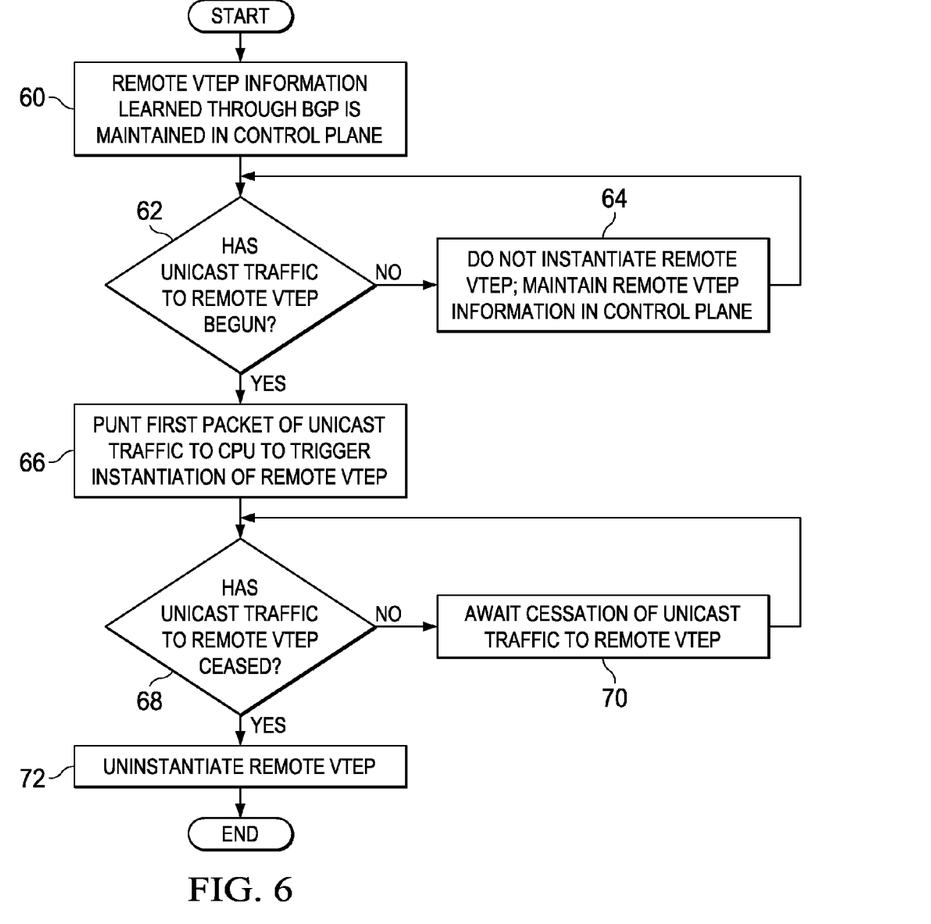
FIG. 6 is a flowchart illustrating operation of the alternative control protocol based approach for remote VTEP instantiation in a VXLAN type of data communications network in accordance with features of embodiments described herein.

FIG. 6 is a flowchart illustrating operation of the alternative control protocol based approach for remote VTEP instantiation in a VXLAN type of data communications network in accordance with features of embodiments described herein. It will be recognized that the steps illustrated in and described with reference to FIG. 6 are implemented at each VTEP. As shown in FIG. 6, in step 60, remote VTEP information acquired through BGP distribution is maintained in the control plane. In step 62, a determination is made whether unicast traffic to the remote VTEP has begun. If not, execution proceeds to step 64, in which the remote VTEP is not instantiated, and returns to step 62. If in step 62, it is determined that unicast traffic to the remote VTEP has begun, execution proceeds to step 66. In step 66, the first packet is punted, or copied, to the CPU, thereby triggering instantiation of the remote VTEP. It should be noted that, in Vinci, the punting can occur when host route conversational learning is turned on. When a host route tied to a VTEP is installed due to conversational learning, a determination can be made whether the remote VTEP is instantiated and if not, instantiation will occur at that time.

In step 68, a determination is made whether unicast traffic to the remote VTEP has ceased. If not, execution proceeds to step 70 to await cessation of unicast traffic to the remote VTEP. If in step 68 it is determined that unicast traffic to the remote VTEP has ceased, execution proceeds to step 72, in which the remote VTEP is uninstantiated. It should be noted that when all host routes tied to a remote VTEP are aged out as a result of host route conversational learning, the remote VTEP may be uninstantiated.

Although the examples are described with reference to VXLAN, it will be recognized that the techniques are equally applicable to other overlay technologies, such as Network Virtualization using Generic Routing Encapsulation ("NVGRE"). Embodiments described herein support data triggered instantiation of remote VTEPs acquired via a control protocol as well as data triggered uninstantiation of remote VTEPs acquired via a control protocol. For bidirectional unicast traffic, hardware resources are conserved to the same extent as the data path learning approach. For unidirectional unicast traffic, hardware resources are conserved better than the data path learning approach. For multicast traffic, hardware resources are conserved better than the data path learning approach. As a result, low cost merchant ASICs with limited hardware may be used to implement VTEPs.

In one example implementation, various devices involved in implementing the embodiments described herein can include software for achieving the described functions. For example, referring to FIG. 5, the VTEPs may be implemented using one or more computer devices comprising software embodied in one or more tangible media for facilitating the activities described herein. The computer device for implementing the VTEPs may also include a memory device (or memory element) for storing information to be used in achieving the functions as outlined herein.

Additionally, the computer device for implementing the VTEPs may include a processor that is capable of executing software or an algorithm to perform the functions as discussed in this Specification, including but not limited to the functions illustrated in and described with reference to FIGS. 5 and 6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in FIGS. 5 and 6 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 5 and 6. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

It should also be noted that, although the examples provided above are described in the context of VXLAN, the techniques described herein may be implemented in the context of numerous other types of overlay techniques capable of supporting multiple network tenants, including, but not limited to, Network Virtualization using Generic Routing Encapsulation ("NVGRE"), in which case a 24-bit Tenant Network Identifier ("TNI") would be employed in place of the VNID to uniquely identify tenants in the network as described above.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   acquiring at a local network element information regarding a remote network element via a control protocol distribution method;
   refraining from instantiating a remote Virtual eXtensible Local Area Network Tunnel End Point ("VTEP") for the remote network element on the local network element until unicast traffic from the local network element to the remote network element via an overlay network has begun;
   detecting unicast traffic from the local network element to the remote network element;
   subsequent to the detecting, instantiating the remote VTEP for the remote network element on the local network element
   installing on the local network element a host route tied to the remote network element;
   detecting whether the remote VTEP for the remote network element is instantiated on the local network element;
   instantiating the remote VTEP for the remote network element on the local network element if instantiation of the remote VTEP for the remote network element on the local network element is not detected;
   uninstantiating the remote VTEP for the remote network element from the local network element upon detection that all host routes to the remote network element are aged out on the local network element.

2. The method of claim 1, wherein the detecting comprises:
   punting a first packet of the unicast traffic from the local network element to the remote network element to a central processing unit ("CPU") associated with the local network element, wherein the punting triggers the instantiating.

3. The method of claim 1, further comprising:
   detecting cessation of the unicast traffic from the local network element to the remote network element; and
   subsequent to the detecting cessation, uninstantiating the remote VTEP for the remote network element from the local network element.

4. The method of claim 1, wherein the installing is performed using conversational learning.

5. The method of claim 1, wherein the local network element and the remote network element each comprises a Virtual eXtensible Local Area Network Tunnel End Point ("VTEP").

6. The method of claim 1 wherein the protocol comprises Border Gateway Protocol ("BGP").

7. The method of claim 1 wherein the overlay network is implemented using Virtual eXtensible Local Area Network ("VXLAN") technology.

8. Non-transitory tangible media that includes code for execution and when executed by a processor is operable to perform operations comprising:

acquiring at a local network element information regarding a remote network element via a control protocol distribution method;

refraining from instantiating a remote Virtual eXtensible Local Area Network Tunnel End Point ("VTEP") for the remote network element on the local network element until unicast traffic from the local network element to the remote network element via an overlay network has begun;

detecting unicast traffic from the local network element to the remote network element; and subsequent to the detecting, instantiating the remote VTEP for the remote network element on the local network element;

installing on the local network element a host route tied to the remote network element;

detecting whether the remote VTEP for the remote network element is instantiated on the local network element;

instantiating the remote VTEP for the remote network element on the local network element if instantiation of the remote VTEP for the remote network element on the local network element is not detected;

uninstantiating the remote VTEP for the remote network element from the local network element upon detection that all host routes to the remote network element are aged out on the local network element.

9. The media of claim 8, wherein the detecting comprises:

punting a first packet of the unicast traffic from the local network element to the remote network element to a central processing unit ("CPU") associated with the local network element, wherein the punting triggers the instantiating.

10. The media of claim 8, wherein the operations further comprise:

detecting cessation of the unicast traffic from the local network element to the remote network element; and subsequent to the detecting cessation, uninstantiating the remote VTEP for the remote network element from the local network element.

11. The media of claim 8, wherein the local network element and the remote network element each comprises a Virtual eXtensible Local Area Network Tunnel End Point ("VTEP").

12. An apparatus, comprising:

a memory element configured to store data; and a processor coupled to said memory element and operable to execute instructions associated with the data;

wherein said processor is configured to:

acquire information regarding a remote network element via a control protocol distribution method;

refrain from instantiating a remote Virtual eXtensible Local Area Network Tunnel End Point ("VTEP") for the remote network element on a local network element until unicast traffic from the local network element to the remote network element via an overlay network has begun;

detect unicast traffic from the local network element to the remote network element;

subsequent to the detecting, instantiating the remote VTEP for the remote network element on the local network element;

install on the local network element a host route tied to the remote network element;

detect whether the remote VTEP for the remote network element is instantiated on the local network element;

instantiate the remote VTEP for the remote network element on the local network element if instantiation of the remote VTEP for the remote network element on the local network element is not detected;

uninstantiate the remote VTEP for the remote network element from the local network element upon detection that all host routes to the remote network element are aged out on the local network element.

13. The apparatus of claim 12, wherein the detecting comprises:

punting a first packet of the unicast traffic from the local network element to the remote network element to a central processing unit ("CPU") associated with the local network element, wherein the punting triggers the instantiating.

14. The apparatus of claim 12, wherein the processor is further configured to:

detect cessation of the unicast traffic from the local network element to the remote network element; and subsequent to the detecting cessation, uninstantiate the remote VTEP for the remote network element from the local network element.

15. The apparatus of claim 12, wherein the local network element and the remote network element each comprise a Virtual eXtensible Local Area Network Tunnel End Point ("VTEP") and the protocol comprises Border Gateway Protocol ("BGP").

* * * * *